June 21, 1938. R. J. DREESZEN 2,121,688
HOG OILER
Filed March 8, 1937 5 Sheets-Sheet 2
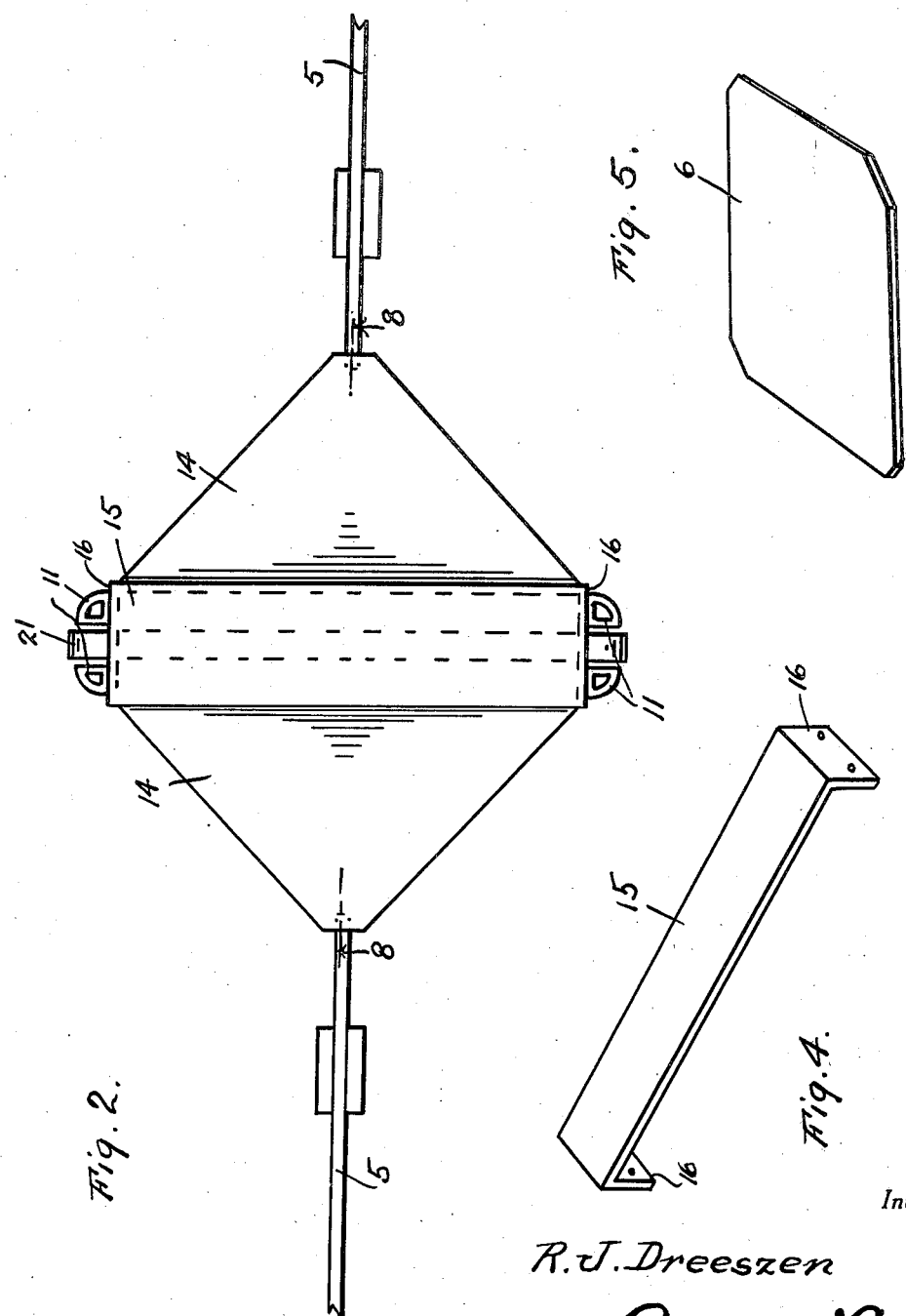
Inventor
R. J. Dreeszen
By Clarence A. O'Brien
Hyman Berman
Attorneys

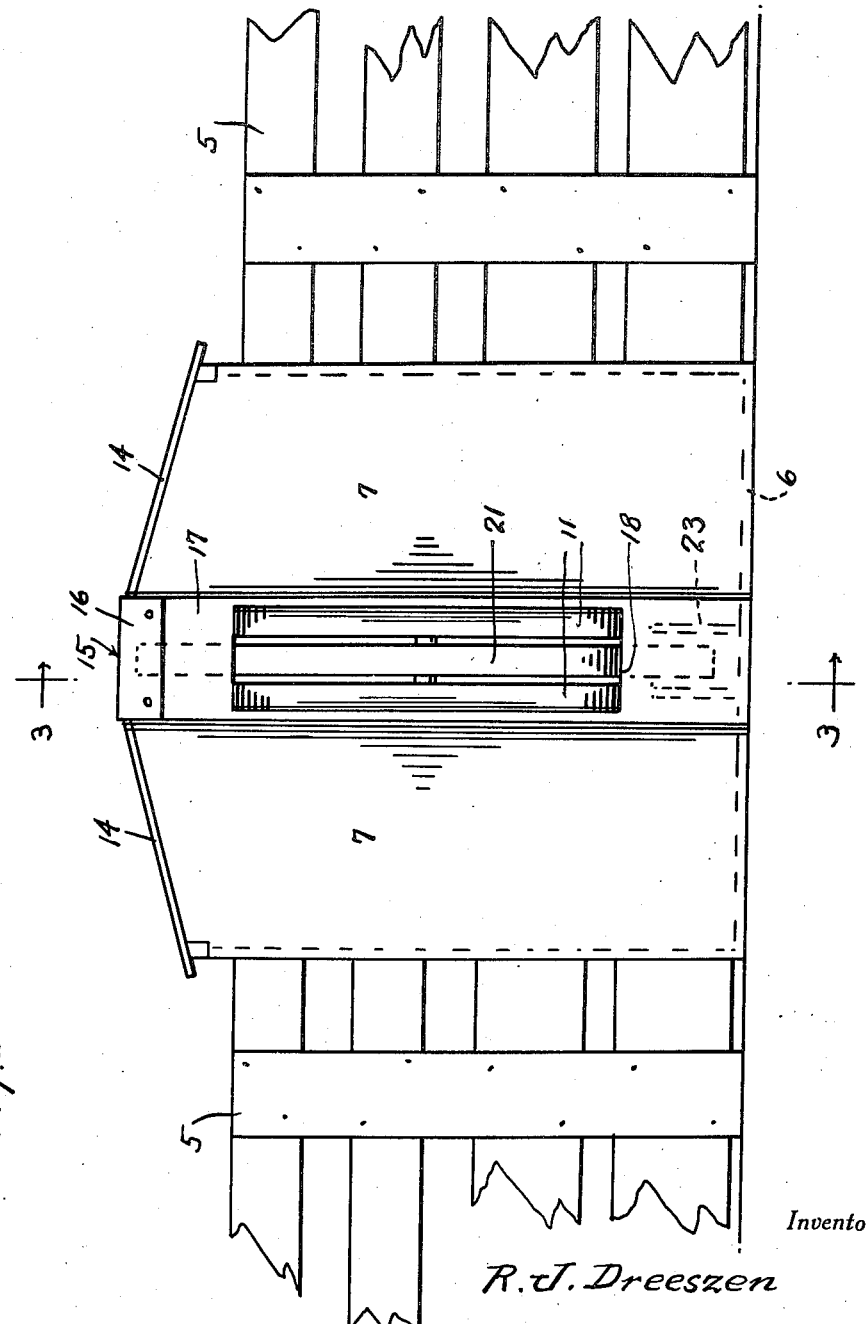

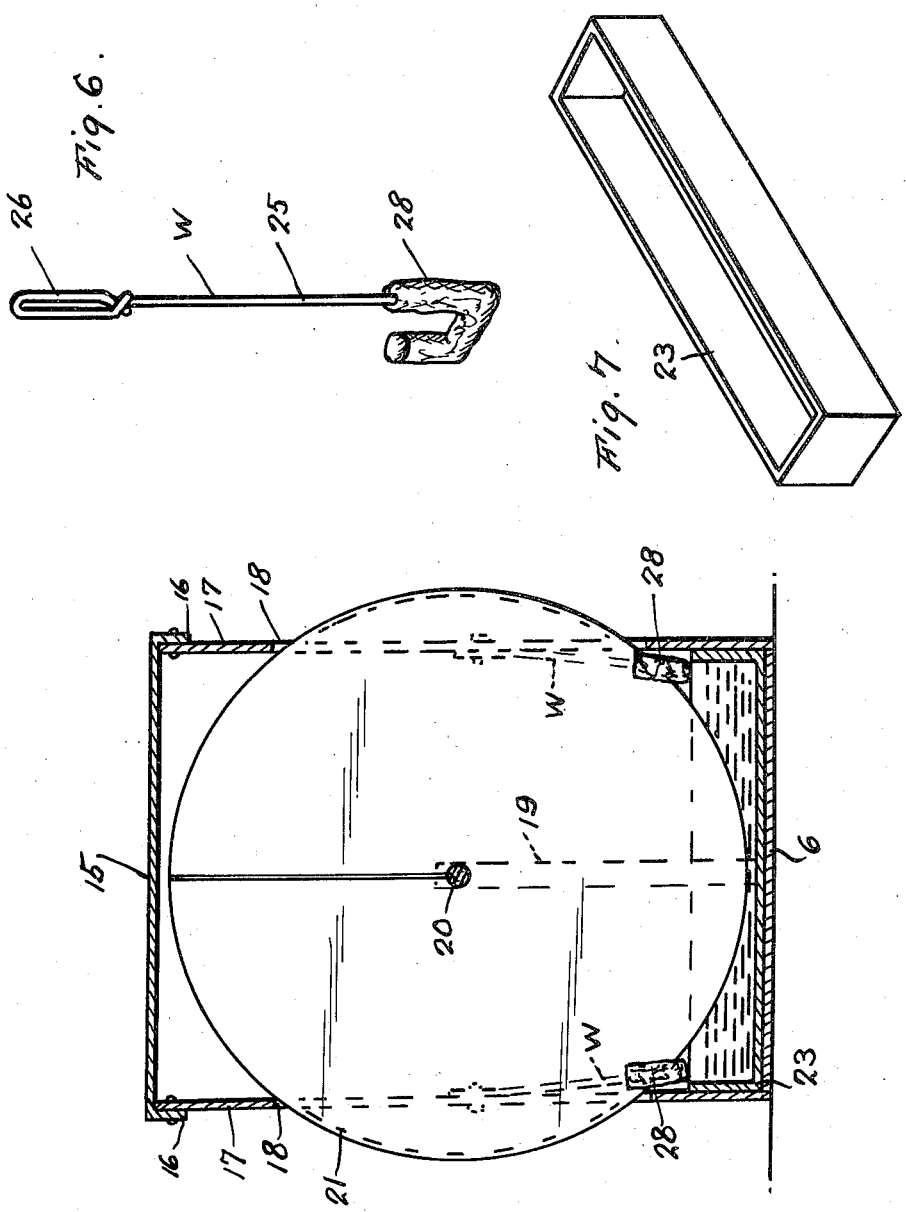

June 21, 1938. R. J. DREESZEN 2,121,688
HOG OILER
Filed March 8, 1937 5 Sheets-Sheet 4
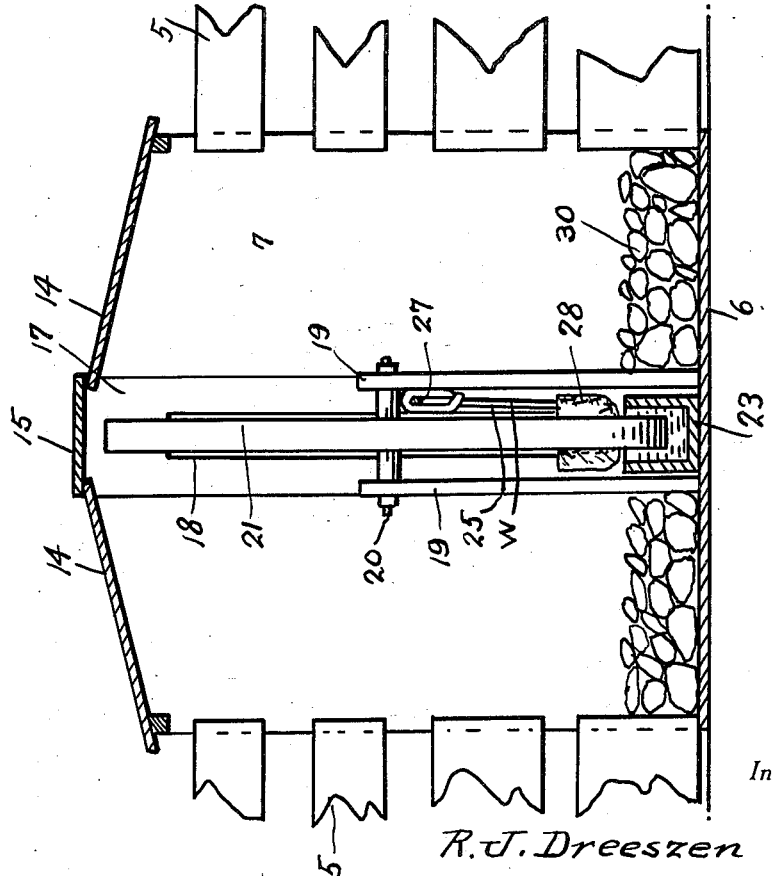
Inventor
R. J. Dreeszen
By Clarence A. O'Brien
Hyman Berman
Attorneys June 21, 1938.   R. J. DREESZEN   2,121,688
HOG OILER
Filed March 8, 1937   5 Sheets-Sheet 5
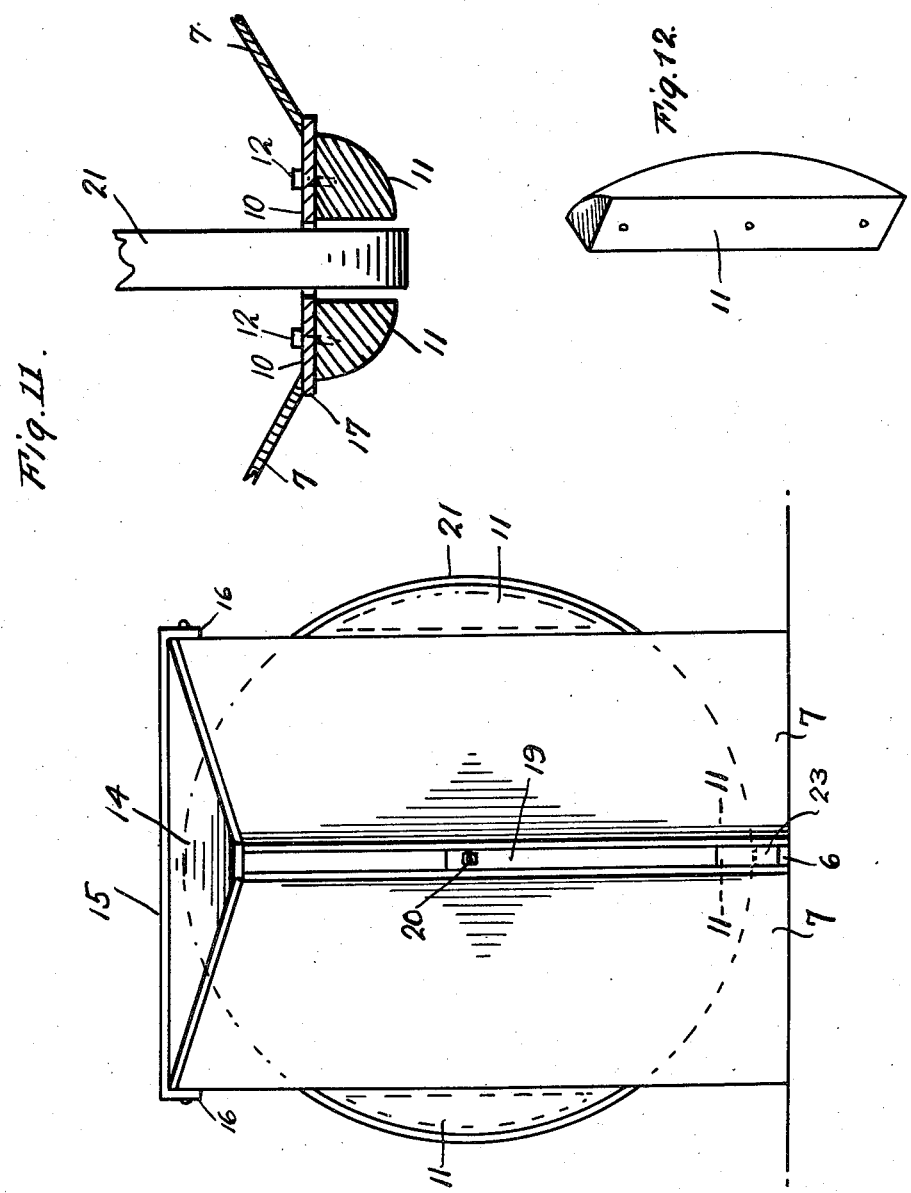
Inventor
R. J. Dreeszen
By Clarence A. O'Brien
Hyman Berman
Attorneys Patented June 21, 1938

2,121,688

UNITED STATES PATENT OFFICE 2,121,688

HOG OILER

Rudolf J. Dreeszen, Douglas Township, Ida County, Iowa

Application March 8, 1937, Serial No. 129,711

3 Claims. (Cl. 119—157)

The present invention appertains to an apparatus for oiling hogs commonly known as hog oilers and is used by stock raisers for destroying vermin on animals by permitting them to rub themselves on a surface coated with oil of a quality suited to the purpose.

The important object of the invention is to provide an improvement of this nature which may be incorporated in a fence structure, and provide a roller having means cooperable therewith to keep the roller coated with oil and to be turned by means of contact by the hogs or other animals therewith.

Another important object of the invention is to provide an improved oiler by which hogs in two different pens are able to use the same oiler, and by which the same oiler may be used by hogs of different sizes.

Another important object of the invention resides in the provision of an apparatus of this nature which is readily usable by the hogs or other animals without any danger of injury thereto.

A still further important object of the invention resides in the provision of a hog oiler of this nature which is simple in its construction, comparatively inexpensive to manufacture and install, strong and durable, thoroughly efficient and reliable in use, the parts thereof being readily accessible, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:—

Figure 1 is a front elevation of the apparatus embodying the features of my invention.

Figure 2 is a top plan view thereof.

Figure 3 is a vertical section taken therethrough substantially on the line 3—3 of Figure 1.

Figure 4 is a perspective view of the central roof strip.

Figure 5 is a perspective of the bottom.

Figure 6 is a perspective view of one of the wiping elements.

Figure 7 is a perspective view of the trough.

Figure 8 is a vertical sectional view taken substantially on the line 8—8 of Figure 2.

Figure 9 is a perspective view of one of the side panels.

Figure 10 is an end elevation of the apparatus.

Figure 11 is a detail sectional view taken substantially on the line 11—11 of Figure 10.

Figure 12 is a perspective view of one of the guard elements.

Referring to the drawings in detail it will be seen that numerals 5 denote portions of a fence with a space therebetween in endwise direction, and my apparatus is located between the ends of said portions. The apparatus is in the form of a casing and comprises a bottom 6 detailed in Figure 5. This bottom is substantially diamond shape, but it is to be noted that the corners are cut away for purposes which will appear as the description proceeds. There are four side panels 7 arranged as shown to advantage in Figures 1, 8, and 10. That is, these side panels are arranged in pairs, each pair having its panels diverging from each other from the end of the casing inwardly and leaving a space at the apex into which portions of the fence end project and, of course, conforming with the edges of the bottom 6. The inner ends of the two pairs of panels are spaced and fixed in suitable manner to plates 10 disposed in spaced relation as shown in Figure 11 and carrying guard members 11 which are bolted thereto as at 12. These guard members have their outer faces of curved streamline construction, and consequently they are adapted to assure a hog contacting the periphery only of the wheel or roller 21.

Triangular top plates 14 are secured on the side panels as is shown to advantage in Figure 10. A top panel 15 extends across the opening between the two plates or panels 14 and has downturned outer ends 16 fixed to plates 17 between the side panels 7. These plates 17 are provided with slots 18. Standards 19 rise from the bottom 6 and support an axle 20 on which is journaled a wheel or roller 21 which constitutes the oiling element and it has a diameter sufficiently large so that its periphery protrudes through the slots 18 but not beyond the outer periphery of the guards 11.

In the casing thus far defined in detail there is located a trough 23 disposed between the two standards 19 and which contains oil or some other suitable fluid through which the peripheral portion of the wheel or roller 21 is adapted to move.

Wiping elements W are provided for cooperation with the peripheral portion of the roller one at each end of the casing. Each wiping element comprises an elongated shank 25 with a loop 26 formed at one end engaged on an element 27 on an adjacent panel 17 and terminating in a U-shaped portion covered with suitable material 28. Of course, there are two of these elements W, one at each end.

In order to weigh down the casing and apparatus as a whole, suitable stones or the like 30 are placed therein as shown to advantage in Figure 8.

It is thought that the construction, operation, utility and advantages of this invention will now be clearly understood without a more detailed description. It will be seen that the hog going along the oiler will engage the wheel and bring about turning thereof and cause the wheel or roller to be properly supplied with oil, and the wipers will prevent a too great supply and that the apparatus is substantial and practical in every way.

The present embodiment of the invention has been described in considerable detail merely for the purposes of exemplification since in actual practice it attains the features of advantage enumerated as desirable in the statement of the invention and the above description.

Having described the invention what is claimed as new is:—

1. An apparatus of the class described comprising a casing with an oil trough in the bottom thereof, an upright wheel, means for journaling the wheel in the casing, said casing having slots through which portions of the periphery of the wheel when turning will protrude, and upright guards for the protruding portions of the wheel, disposed at opposite sides of said portions outside of the casing and having convex outer sides.

2. An apparatus of the class described comprising a casing with an oil trough in the bottom thereof, an upright wheel, means for journaling the wheel in the casing, said casing having slots through which portions of the periphery of the wheel when turning will protrude, upright guards for the protruding portions of the wheel, disposed at opposite sides of said portions outside the casing and having convex outer sides, and wipers associated with the wheel at the ends of the trough said wipers connected to and pendent from portions of the casing and having lower hook-shaped portions straddling the periphery of the wheel.

3. An apparatus of the class described comprising a casing with an oil trough in the bottom thereof, a wheel, means for journaling the wheel in the casing, said casing having slots through which portions of the periphery of the wheel when turning will protrude, guards for the protruding portions of the wheel, wipers associated with the wheel at the ends of the trough, said casing being provided with portions for receiving the protruding ends of a fence so as to be incorporated in the fence structure.

RUDOLF J. DREESZEN.